US006661441B2

(12) United States Patent
Wagner

(10) Patent No.: US 6,661,441 B2
(45) Date of Patent: Dec. 9, 2003

(54) COMBINED LENS, HOLDER, AND APERTURE

(75) Inventor: Moritz P. Wagner, Walworth, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 10/059,965

(22) Filed: Jan. 30, 2002

(65) Prior Publication Data

US 2003/0142193 A1 Jul. 31, 2003

(51) Int. Cl.[7] .............................. B41J 2/44; G02B 3/00

(52) U.S. Cl. ....................... 347/134; 347/137; 347/256; 359/737

(58) Field of Search ................................ 347/134, 135, 347/136, 137, 241–4, 256–8; 355/71; 399/218, 221; 359/614, 719, 737, 738, 739

(56) References Cited

U.S. PATENT DOCUMENTS 3,764,198 A * 10/1973 Hunzinger .................. 359/739
5,208,796 A 5/1993 Wong et al.
5,381,165 A 1/1995 Lofthus et al.
6,195,113 B1 2/2001 Hoover
6,282,033 B1 8/2001 Ning
6,356,398 B1 * 3/2002 Otsuki et al. ............... 359/739

FOREIGN PATENT DOCUMENTS

JP 2000-147346 A * 5/2000

* cited by examiner

*Primary Examiner*—Joan Pendegrass
(74) *Attorney, Agent, or Firm*—David E. Henn

(57) ABSTRACT

A refractive body includes a lens, holder, and aperture particularly suited for use in raster scanners. The refractive body advantageously can be made from resinous materials, such as plastics, but can be formed from any refractive material as may be appropriate. The aperture is formed from portions of the refractive body surrounding the lens and can act to divert excess light from the optical path of the scanner by refraction or reflection.

22 Claims, 5 Drawing Sheets

COMBINED LENS, HOLDER, AND APERTURE

BACKGROUND AND SUMMARY

Xerographic printing and reproduction machines, such as that shown schematically in FIG. 1, typically include raster scanners: raster output scanners (ROSs) for printing and raster input scanners (RISs) for image acquisition in reproduction. In raster scanning systems, an imaging light beam scans across a rotating polygon to a movable photoconductive member, recording or writing electrostatic latent images on the member. Generally, a ROS has a laser for generating a collimated beam of monochromatic radiation. The laser beam is modulated in conformance with the image information. The modulated beam is reflected through a lens onto a scanning element, typically a rotating polygon having mirrored facets. Many machines use one ROS for each color being printed, the ROS exposing the photoreceptor to light in a pattern representing an image to be printed, as is known in the art. In multipass machines, a single ROS can write the image for each color. The pattern on the exposed photoreceptor is then used to deposit toner on a substrate, which toner is then fused onto the substrate to produce the final printed image.

As an example of the environment in which embodiments can be employed, FIG. 1 schematically illustrates an electrophotographic printing machine 1 that uses raster scanners (RIS 128 and ROS 130) and generally employs a photoconductive belt 12. Preferably, the photoconductive belt 12 is made from a photoconductive material coated on a ground layer, which, in turn, is coated on an anti-curl backing layer. Belt 12 moves in the direction of arrow 18 to advance successive portions sequentially through the various processing stations disposed about the path of movement thereof. Belt 12 is entrained about stripping roller 14, tensioning roller 15 and drive roller 16. As roller 16 rotates, it advances belt 12 in the direction of arrow 13.

Initially, a portion of the photoconductive surface passes through charging station A. At charging station A, a corona generating device indicated generally by the reference numeral 122 charges the photoconductive belt 12 to a relatively high, substantially uniform potential.

At an exposure station, B, a controller or electronic subsystem (ESS), indicated generally by reference numeral 129, receives the image signals representing the desired output image and processes these signals to convert them to a continuous tone or greyscale rendition of the image which is transmitted to a modulated output generator, for example the raster output scanner (ROS), indicated generally by reference numeral 130. Preferably, ESS 129 is a self-contained, dedicated minicomputer. The image signals transmitted to ESS 129 may originate from a RIS as described above or from a computer, thereby enabling the electrophotographic printing machine to serve as a remotely located printer for one or more computers. Alternatively, the printer may serve as a dedicated printer for a high-speed computer. The signals from ESS 129, corresponding to the continuous tone image desired to be reproduced by the printing machine, are transmitted to ROS 130. ROS 130 includes a laser with rotating polygon mirror blocks. The ROS will expose the photoconductive belt to record an electrostatic latent image thereon corresponding to the continuous tone image received from ESS 129. As an alternative, ROS 130 may employ a linear array of light emitting diodes (LEDs) arranged to illuminate the charged portion of photoconductive belt 12 on a raster-by-raster basis.

After the electrostatic latent image has been recorded on photoconductive surface, belt 12 advances the latent image to a development station, C, where toner, in the form of liquid or dry particles, is electrostatically attracted to the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 144, dispenses toner particles into developer housing 146 of developer unit 138.

With continued reference to FIG. 1, after the electrostatic latent image is developed, the toner powder image present on belt 12 advances to transfer station D. A print sheet 148 is advanced to the transfer station, D, by a sheet feeding apparatus, 150. Preferably, sheet feeding apparatus 150 includes a nudger roll 151 which feeds the uppermost sheet of stack 154 to nip 155 formed by feed roll 152 and retard roll 153. Feed roll 152 rotates to advance the sheet from stack 154 into vertical transport 156. Vertical transport 156 directs the advancing sheet 148 of support material into the registration transport 120 of the invention herein, described in detail below, past image transfer station D to receive an image from photoreceptor belt 12 in a timed sequence so that the toner powder image formed thereon contacts the advancing sheet 148 at transfer station D. Transfer station D includes a corona generating device 158 which sprays ions onto the back side of sheet 148. This attracts the toner powder image from photoconductive surface to sheet 148. The sheet is then detacked from the photoreceptor by corona generating device 159 which sprays oppositely charged ions onto the back side of sheet 148 to assist in removing the sheet from the photoreceptor. After transfer, sheet 148 continues to move in the direction of arrow 60 by way of belt transport 162 which advances sheet 148 to fusing station F.

Fusing station F includes a fuser assembly indicated generally by the reference numeral 170 which permanently affixes the transferred toner powder image to the copy sheet. Preferably, fuser assembly 170 includes a heated fuser roller 172 and a pressure roller 174 with the powder image on the copy sheet contacting fuser roller 172. The pressure roller is cammed against the fuser roller to provide the necessary pressure to fix the toner powder image to the copy sheet. The fuser roll is internally heated by a quartz lamp (not shown). Release agent, stored in a reservoir (not shown), is pumped to a metering roll (not shown). A trim blade (not shown) trims off the excess release agent. The release agent transfers to a donor roll (not shown) and then to the fuser roll 172.

The sheet then passes through fuser 170 where the image is permanently fixed or fused to the sheet. After passing through fuser 170, a gate 180 either allows the sheet to move directly via output 184 to a finisher or stacker, or deflects the sheet into the duplex path 100, specifically, first into single sheet inverter 182 here. That is, if the sheet is either a simplex sheet, or a completed duplex sheet having both side one and side two images formed thereon, the sheet will be conveyed via gate 180 directly to output 184. However, if the sheet is being duplexed and is then only printed with a side one image, the gate 180 will be positioned to deflect that sheet into the inverter 182 and into the duplex loop path 100, where that sheet will be inverted and then fed to acceleration nip 102 and belt transports 110, for recirculation back through transfer station D and fuser 170 for receiving and permanently fixing the side two image to the backside of that duplex sheet, before it exits via exit path 184.

After the print sheet is separated from photoconductive surface of belt 12, the residual toner/developer and paper fiber particles adhering to photoconductive surface are removed therefrom at cleaning station E. Cleaning station E includes a rotatably mounted fibrous brush in contact with photoconductive surface to disturb and remove paper fibers and a cleaning blade to remove the non-transferred toner particles. The blade may be configured in either a wiper or doctor position depending on the application. Subsequent to cleaning, a discharge lamp (not shown) floods photoconductive surface with light to dissipate any residual electrostatic charge remaining thereon prior to the charging thereof for the next successive imaging cycle.

The various machine functions are regulated by controller 129. The controller is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

To reduce cost in raster scanner optics, many manufacturers have turned to plastic lenses. In addition to lower cost, plastic lenses can easily be manufactured to include their own holders in the part design. This reduces material costs, manufacturing costs, and assembly costs by part count reduction. It also reduces the part weight. However, raster scanners require an aperture to prevent excess light from passing through the lens. Such apertures typically include a piece of sheet metal with a hole of the right shape and size in it. The area surrounding the lens is therefore covered up and no light can go past the lens except the desired light that goes through the hole. The requirement for such an aperture prevents further cost reduction and part number reduction.

Additional cost and part number reductions can be achieved by including the aperture in the design of the lens. Since the lens is clear, the material to be used for the part must be clear. Thus, an aperture can be formed by surrounding the lens with one or more refractive surfaces that direct the undesired part of the light beam away from the optical path, which can include another lens or a mirror. The excess light can, for example, be absorbed by the housing of the raster scanner.

DETAILED DESCRIPTION

Figure 1:
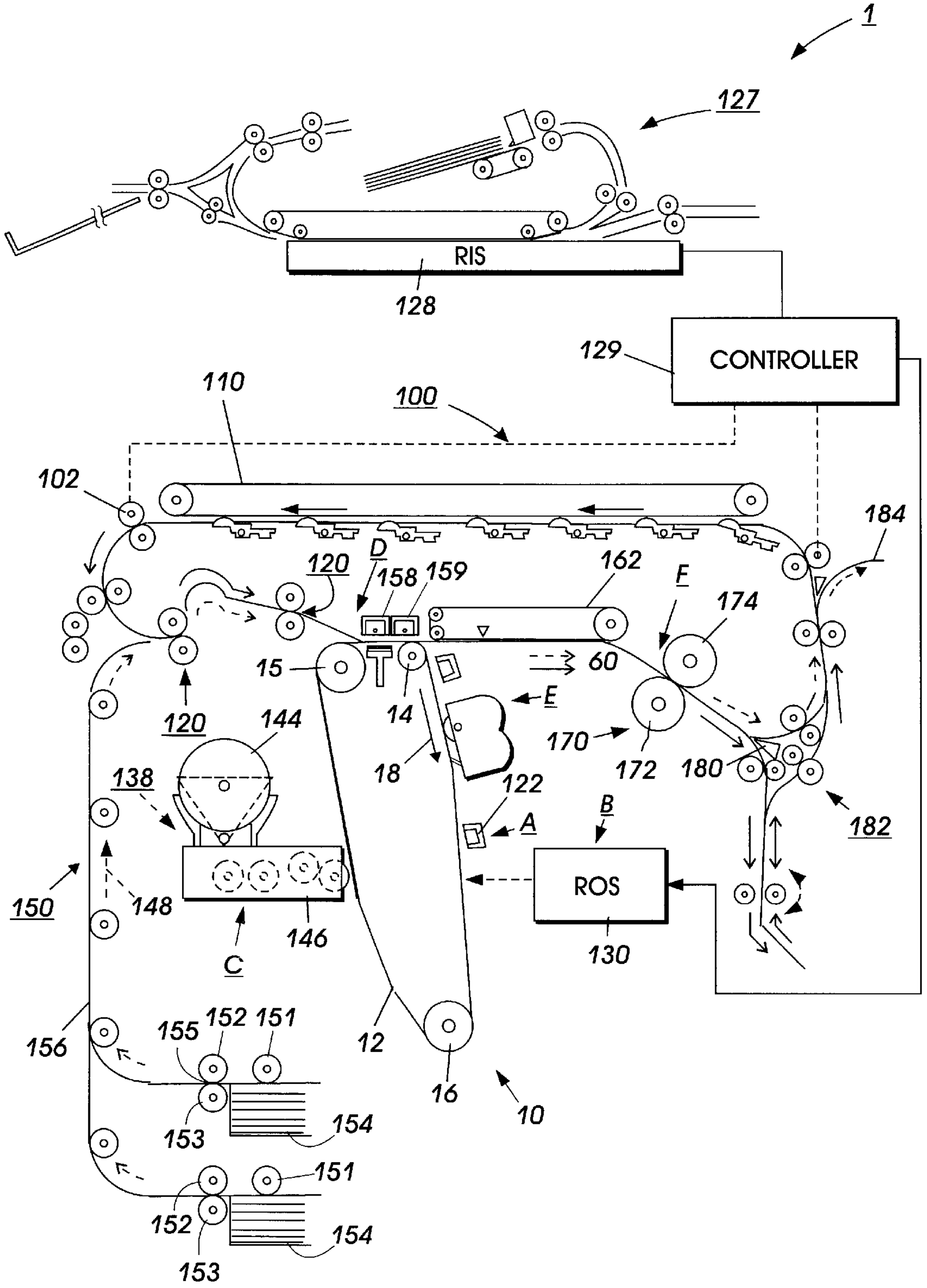
FIG. 1 is a schematic illustration of a xerographic reproduction machine including a raster input scanner (RIS) and a raster output scanner (ROS). Note that a xerographic reproduction machine incorporates a xerographic printing machine.

For simplicity, embodiments are described in a raster output scanner (ROS), such as that represented by ROS 130 in FIG. 1, in the context of a xerographic printing machine, such as that shown schematically in FIG. 1. However, those of ordinary skill in the art will understand that embodiments can be applied in other contexts, to other raster scanners, and to other devices requiring an aperture about a lens. Further, while embodiments take advantage of the low cost and easy manipulation of resinous materials, such as plastics, other embodiments can employ glass or other materials refractive of the particular frequencies of electromagnetic radiation the invention would be used to modify.

Figure 2:
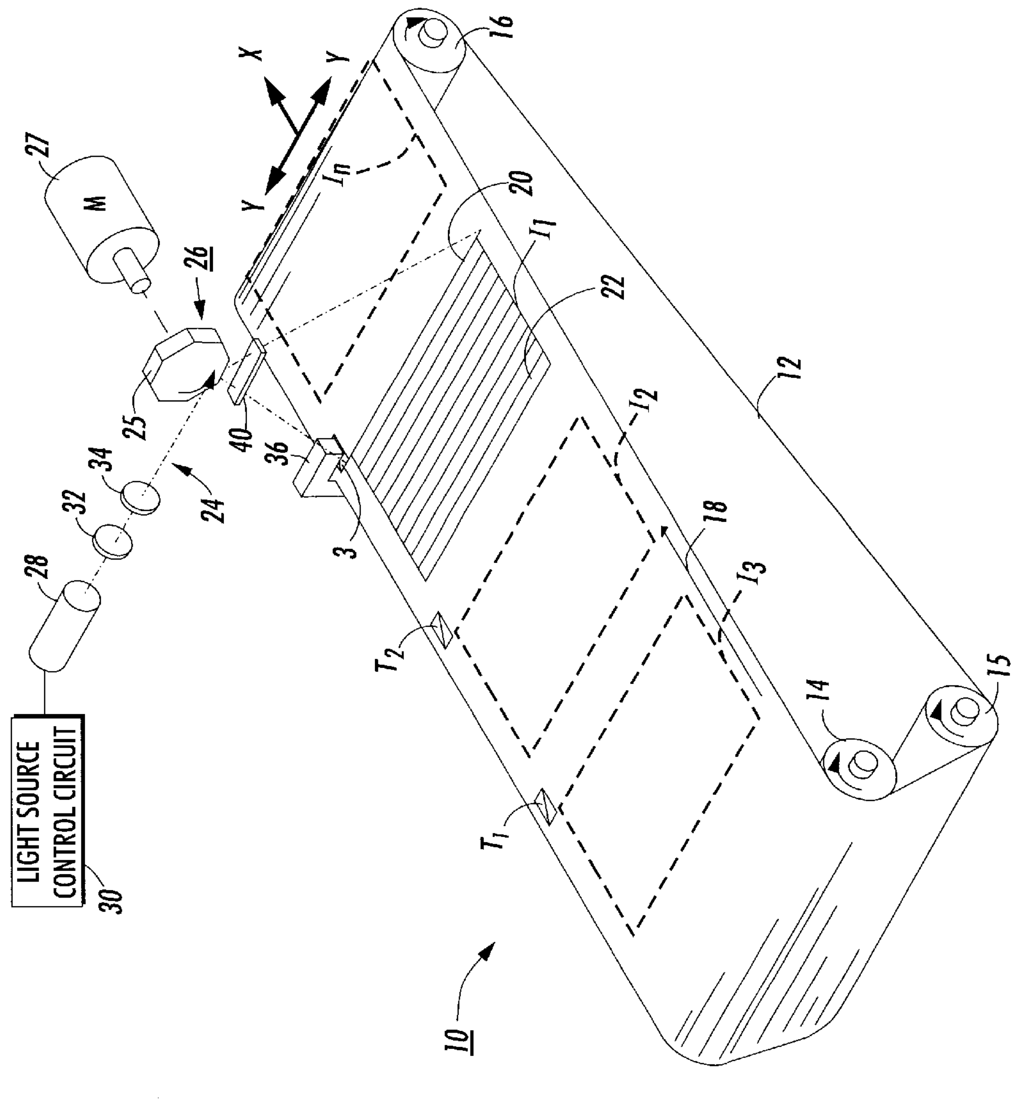
FIG. 2 PRIOR ART
FIG. 2 is a schematic illustration of a raster output scanner employing an embodiment.

As illustrated in FIG. 2, the typical ROS includes a light source 28, a collimating lens 32, and an aperture 34 that eliminates excess light. Such an ROS can be part of a multipass xerographic printing subsystem such as that depicted schematically and designated generally by reference numeral 10, which can be part of a xerographic printing machine 1 such as that shown in FIG. 1 and described above. The system 10 includes a photoreceptive belt 12 entrained about guide rollers 14 and 16, at least one of which is driven to advance the belt 12 in a longitudinal direction of processing travel depicted by the arrow 18. The length of the belt 12 is designed to accept an integral number of spaced image areas $I_1$–$I_n$ represented by dashed line rectangles in FIG. 2. As each of the image areas $I_1$–$I_n$ reaches a transverse line of scan, represented at 20, it is progressively exposed on closely spaced transverse raster lines 22 shown with exaggerated longitudinal spacing on the image area $I_1$ in FIG. 2.

In FIG. 2, the line 20 is scanned by a raster output scanner so that a modulated laser beam 24 is reflected to the line 20 by successive facets 25 on a rotatable polygon-shaped mirror 26 driven by motor 27 providing suitable feedback signals to control 30. The beam 24, illustrated in dotted lines, is emitted by a laser device 28, such as a laser diode, operated by a laser drive module and power control forming part of a control processor generally designated by the reference numeral 30. The processor 30 includes other not shown circuit or logic modules such as a scanner drive command circuit, by which operation of motor 27 for rotating the polygon mirror 26 is controlled. A start of scan (SOS) sensor, illustrated at 36, determines a start of scan reference point and also provides suitable feedback signals to control 30.

In the operation of the system 10, as thus far described, the control 30 responds to a video signal to expose each raster line 22 to a linear segment of the video signal image. In xerographic color systems, each image area $I_1$–$I_n$ must be exposed in the same manner to four successive exposures, one for each of the three basic colors and black. In a multi-pass system such as the system 10, where only one raster output scanner or head is used, complete exposure of each image area requires four revolutions of the belt 12. It should also be noted that the present invention is equally applicable to black and white exposure systems.

The image areas $I_1$–$I_n$ are successively exposed on successive raster lines 22 as each raster line registers with a transverse scan line 20 as a result of longitudinal movement of the belt 12. The transverse scan line 20 in system 10 is longer than the transverse dimension of the image areas I. Scan line length, in this respect, is determined by the length of each mirror facet 25 and exceeds the length of the raster lines 22. The length of each raster line is determined by the time during which the laser diode is active to reflect a modulated beam from each facet 25 on the rotating polygon 26 as determined by the laser drive module. Thus, the active portion of each transverse scan line may be shifted in a transverse direction by control of the laser drive module and the transverse position of the exposed raster lines 22, and image areas $I_1$–$I_n$, shifted in relation to the belt 12.

Downstream from the exposure station, a development station (not shown) develops the latent image formed in the preceding image area as described above with relation to the xerographic printing machine shown in FIG. 1. After the last color exposure, a fully developed color image is then transferred to an output sheet. An Electronic Sub System (ESS) ( such as ESS 129 shown in FIG. 1) contains the circuit and logic modules that respond to input video data signals and other control and timing signals to drive the photoreceptor belt 12 synchronously with the image exposure and to control the rotation of the polygon by the motor. For further details, reference is made to U.S. Pat. Nos. 5,381,165 and 5,208,796 the disclosures of which are incorporated by reference. As illustrated, any suitable marker on the photoconductive surface or belt or any suitable hole, such as T1, T2, and T3, can provide a reference for each projected image on the belt surface. A microprocessor typically controls the laser with two control loops: a Bias control loop, and a Level Control loop. The same microcontroller can also act as the Motor Polygon Assembly (MPA) speed control and all sub-system applications, such as softstart ramping of lasers and diagnostics of laser failures with controlled ROS shutdowns. For additional details of the raster scanner control systems, see, for example, U.S. Pat. No. 6,195,113, the disclosure of which is hereby incorporated by reference.

The light beam 24 is reflected from a facet 25 and thereafter focused to a "spot" on the photosensitive member using optics 40. The rotation of the polygon 26 causes the spot to scan across the photoconductive member 12 in a fast scan (i.e., line scan) direction. Meanwhile, the photoconductive member 12 is advanced relatively more slowly than the rate of the fast scan in a slow scan (process) direction indicated by arrow 18 which is orthogonal to the fast scan direction, which is parallel to the axis Y-Y. In this way, the beam 24 scans the recording medium 12 in a raster scanning pattern. The light beam 24 is intensity-modulated in accordance with an input image serial data stream at a rate such that individual picture elements ("pixels") of the image represented by the data stream are exposed on the photosensitive medium to form the latent image, which is then transferred to an appropriate image receiving medium such as paper.

Before the light reaches the rotating polygon 26, it passes through the collimating lens 32, which conditions the modulated laser beam 24 to ensure proper spot formation on the belt 12. After the beam 24 passes through the lens 32, it is further conditioned by passing through an aperture 34. The aperture 34 blocks and/or diverts excess light that would hamper proper spot formation on the belt 12. The aperture 34 can be a refractive aperture that diverts excess light away from the path of the beam 24, a reflective aperture that reflects the light away from the path, or an absorptive aperture that simply absorbs the excess light. Once through the aperture 34, the beam 24 proceeds to the polygon 26 as described above. It can be said that the lens 32 and aperture 34 are in "photonic communication" with the light source 28, and that the lens 32, aperture 34, polygon 26, optics 40, and even the belt 12 lie on an optical path of the ROS. Further, the photonic communication between the light source 28 and the various elements on the optical path is selective inasmuch as the beam 24 will disappear when the light source 28 is turned off.

Figure 3:
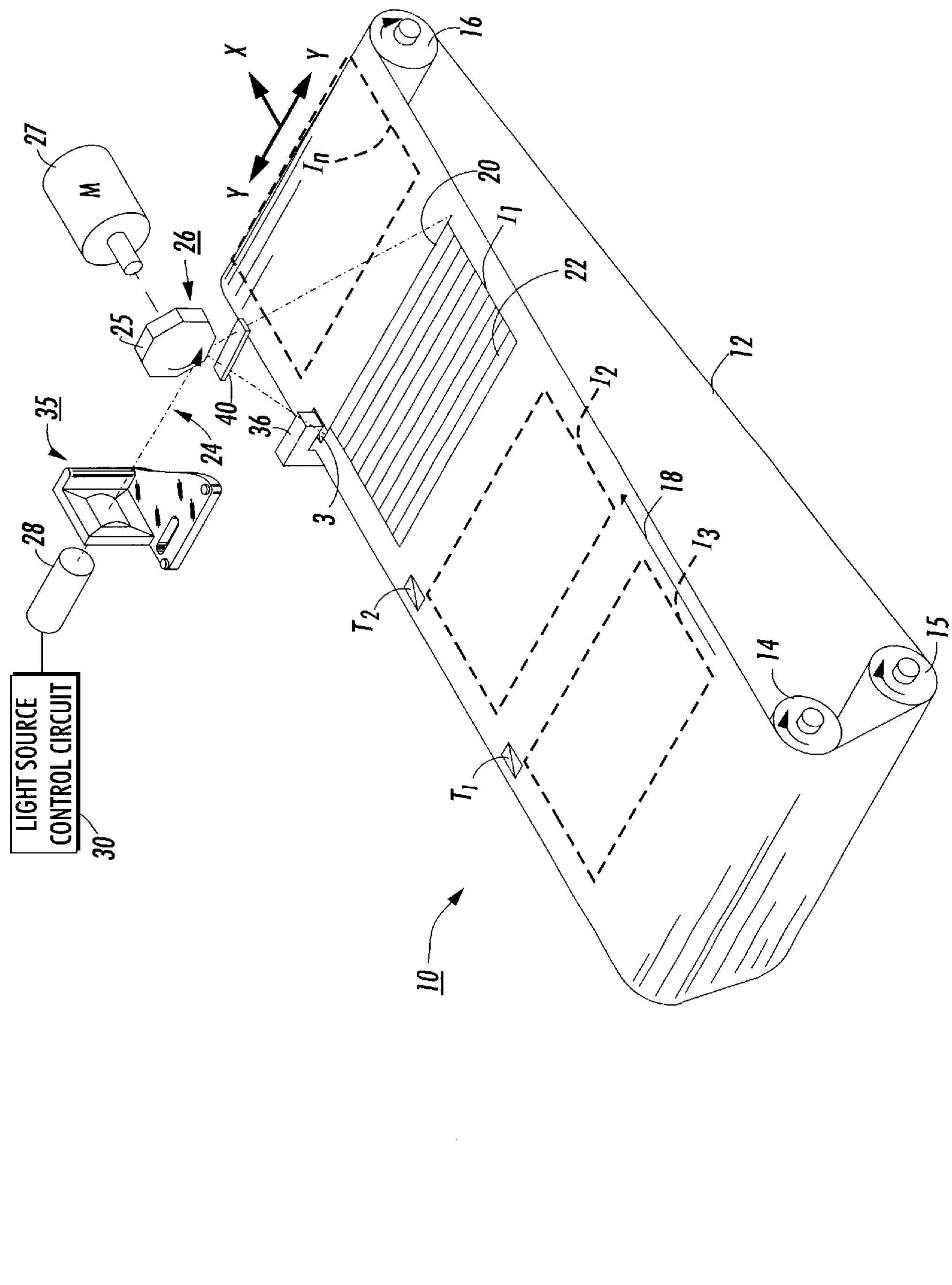
FIG. 3 is a schematic elevational of an embodiment.
Figure 4:
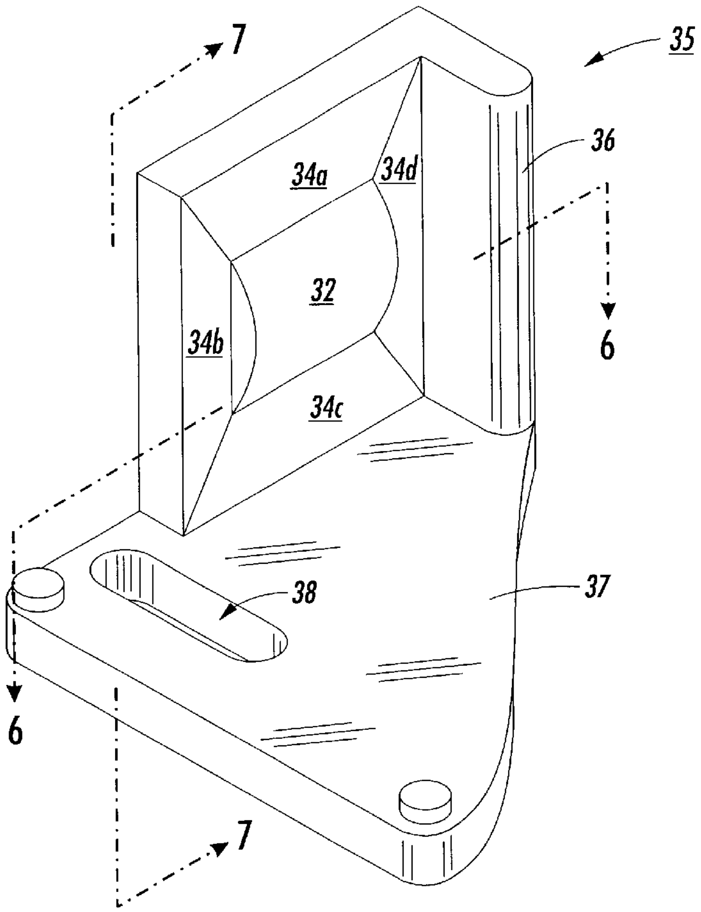
FIG. 4 is a schematic top view of an embodiment.
Figure 5:
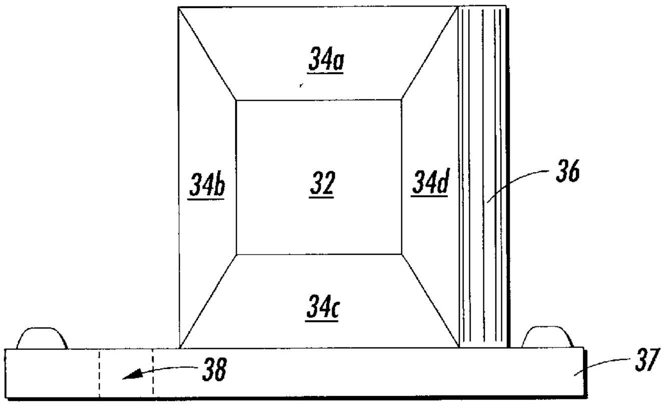
FIG. 5 is a schematic cross sectional view of an embodiment taken along the line 5—5 in FIG. 4.
Figure 6:
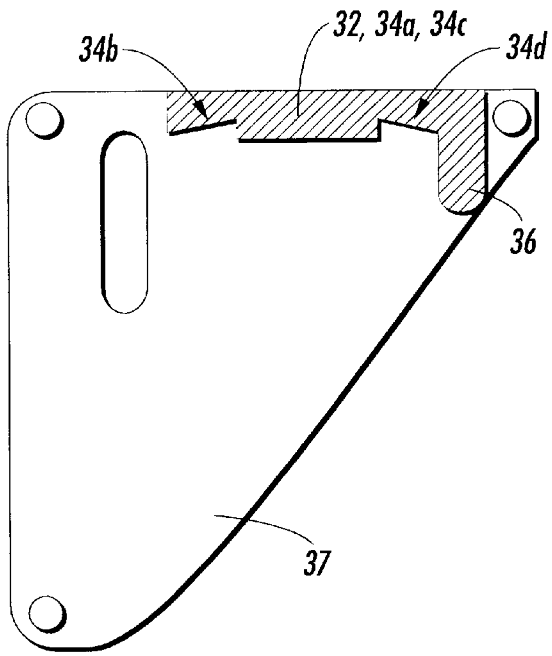
FIG. 6 is a schematic cross sectional view of an embodiment taken along the line 6—6 in FIG. 4.
Figure 7:
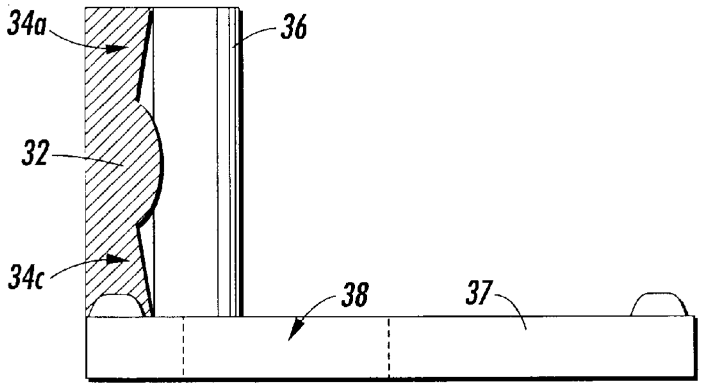
FIG. 7 is a schematic cross sectional view of an embodiment taken perpendicular to line 7—7 in FIG. 3.

With particular reference to FIGS. 3–7, embodiments can be incorporated into an ROS such as that shown in FIG. 3. The ROS includes a light source 28, a rotating polygonal mirror 26, and a light-conditioning member 35 interposed between the light source 28 and the mirror 26. The light conditioning member 35 includes a lens 32 and an aperture 34 combined into the single member 35. The lens 32 can, for example, collimate the light emitted by the light source 28 as in the prior art ROS. In addition, the aperture 35 can remove excess light from the optical path of the scanner.

With particular reference to FIGS. 3–7, embodiments can be incorporated into an ROS such as that shown in FIG. 3. The ROS includes a light source 28, a rotating polygonal mirror 26, and a light-conditioning member 35 interposed between the light source 28 and the mirror 26. The light conditioning member 35 includes a lens 32 and an aperture 34 combined into the single member 35. The lens 32 can, for example, collimate the light emitted by the light source 28 as in the prior art ROS. In addition, the aperture 34 and/or member 35 can remove excess light from the optical path of the scanner.

In embodiments, the member 35 can include portions 34*a–d*, such as facets, that divert light away from the optical path of the ROS, as by refraction or reflection, to form the aperture 34 for and around the lens 32. Whether by refraction or reflection, the light diverted by the aperture 34 can be directed at and absorbed by a housing of the ROS.

Embodiments employ refractive portions 34*a–d* of a refractive version of the member 35 that refract light away from the optical/beam path. In such instances, outer surfaces of the refractive portions 34*a–d* should be angled relative to the optical path taking into account the indices of refraction of air and of the refractive material used in the refractive body. Other embodiments employ reflective surfaces of the portions 34*a–d* that reflect light away from the optical path. In such instances, outer surfaces of the refractive version of the member 35 are polished or coated to be reflective and are angled to reflect light away from the optical path. Additionally, the portions 34*a–d* can be coated with a material that will absorb the excess light from the beam 24.

While embodiments have been described in the context of the frequencies of light used in xerographic printing machines, it is conceivable that embodiments could employ a refractive body that could accommodate other frequencies of light. For example, a refractive body made from fused silica could serve as a lens and aperture for ultraviolet radiation.

Other modifications of the present invention may occur to those skilled in the art subsequent to a review of the present application, and these modifications, including equivalents thereof, are intended to be included within the scope of the present invention.

What is claimed is:

1. A combined lens and aperture comprising:

a lens in selective photonic communication with a light source and a target, the lens and the target lying on an optical path;

at least one surface about the lens that redirects excess light to an absorptive body; and wherein the combination is part of a raster scanner.

2. The combination of claim 1 wherein the lens is made from a transparent resinous material.

3. The combination of claim 1 wherein the at least one surface is made from a transparent resinous material.

4. The combination of claim 1 wherein the lens and the at least one surface are both formed on the same body.

5. The combination of claim 1 wherein the at least one surface is reflective.

6. The combination of claim 1 wherein the at least one surface is refractive.

7. The combination of claim 1 wherein the raster scanner is one of a raster input scanner and a raster output scanner.

8. A combined lens and aperture comprising:

a lens in selective photonic communication with a light source and a target, the lens and the target lying on an optical path;

at least one surface about the lens that redirects excess light to an absorptive body; and wherein the body is formed from fused silica.

9. A refractive body including:

a lens portion;

an aperture portion surrounding the lens portion and directing excess light off of an optical path coincidental with a major axis of the lens portion; and wherein the refractive body is part of a rater scanner.

10. The refractive body of claim 9 wherein the aperture portion includes at least one reflective surface that reflects light away from the optical path.

11. The refractive body of claim 9 wherein the aperture portion includes at least one refractive portion that refracts light away from the optical path.

12. The refractive body of claim 9 wherein the refractive body comprises glass.

13. The refractive body of claim 9 wherein the refractive body comprises a transparent resinous material.

14. The refractive body of claim 9 wherein the raster scanner is one of a raster output scanner and a raster input scanner.

15. A refractive body including:

a lens portion;

an aperture portion surrounding the lens portion and directing excess light off of an optical path coincidental with a major axis of the lens portion; and wherein the refractive body comprises fused silica.

16. A xerographic printing machine including a raster scanner comprising a refractive body, the refractive body itself comprising:

a lens portion;

an aperture portion surrounding the lens portion and directing excess light off of an optical path.

17. The xerographic printing machine of claim 16 wherein the aperture portion includes at least one reflective surface that reflects light away from the optical path.

18. The xerographic printing machine of claim 16 wherein the aperture portion includes at least on refractive portion that refracts light away from the optical path.

19. The xerographic printing machine of claim 16 wherein the refractive body comprises glass.

20. The xerographic printing machine of claim 16 wherein the refractive body comprises a transparent resinous material.

21. The xerographic printing machine of claim 16 wherein the refractive body comprises fused silica.

22. The xerographic printing machine of claim 16 wherein the raster scanner is one of a raster output scanner and a raster input scanner.

* * * * *